United States Patent
Schaurer et al.

(10) Patent No.: US 10,293,781 B2
(45) Date of Patent: May 21, 2019

(54) HINGE DEVICE WITH LIFTING DEVICE

(71) Applicant: Bayerische Motoren Werke Aktiengesellschaft, Munich (DE)

(72) Inventors: Michael Schaurer, Erding (DE); Anton Kieferl, Schweitenkirchen (DE); Andreas Mayer, Munich (DE); Michael Kelm, Friedberg (DE); Ulrich Koestler, Hebertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 74 days.

(21) Appl. No.: 15/687,031

(22) Filed: Aug. 25, 2017

(65) Prior Publication Data
US 2017/0349137 A1  Dec. 7, 2017

Related U.S. Application Data

(63) Continuation of application No. PCT/EP2016/052132, filed on Feb. 2, 2016.

(30) Foreign Application Priority Data

Feb. 27, 2015  (DE) .................. 10 2015 203 513

(51) Int. Cl.
*B60R 21/38*  (2011.01)
(52) U.S. Cl.
CPC .................... *B60R 21/38* (2013.01)
(58) Field of Classification Search
CPC ........................................ B60R 21/38
See application file for complete search history.

(56) References Cited

U.S. PATENT DOCUMENTS

2006/0213191 A1   9/2006 Borg et al.

FOREIGN PATENT DOCUMENTS

DE         101 52 621 A1    5/2003
DE   10 2004 062 105 A1    7/2006
(Continued)

OTHER PUBLICATIONS

International Search Report (PCT/ISA/210) issued in PCT Application No. PCT/EP2016/052132 dated Apr. 13, 2016 with English translation (seven pages).
(Continued)

*Primary Examiner* — Karen Beck
(74) *Attorney, Agent, or Firm* — Crowell & Moring LLP (57) ABSTRACT

A hinge device of a front hood of a motor vehicle is adjustable from a normal position into a protective position in the event of a collision. A front-hood surface and a lifting device with an actuator contact surface and a front-hood contact surface are provided on a front-hood-fastening part. An actuator surface can be brought to bear against the actuator contact surface and the front-hood contact surface can be brought to bear against the front-hood surface during an adjustment from the normal position into the protective position. The distance, which is provided substantially in the actuating direction of the actuator on the lifting device, between the front-hood contact surface and the actuator contact surface is greater than the distance between the actuator surface and the front-hood hinge-lever contact surface. Furthermore, a correspondingly equipped motor vehicle and a method for opening out the hinge device are provided.

16 Claims, 4 Drawing Sheets

(56) References Cited

FOREIGN PATENT DOCUMENTS

| | | | |
|---|---|---|---|
| DE | 10 2009 040 413 A1 | 3/2011 | |
| DE | 10 2009 041 418 A1 | 4/2011 | |
| DE | 102010029719 A1 * | 12/2011 | ............ B60R 21/38 |
| DE | 102011006133 A1 * | 9/2012 | ............ B60R 21/38 |
| DE | 10 2011 106 513 A1 | 12/2012 | |
| DE | 10 2011 056 844 A1 | 6/2013 | |
| DE | 102015208392 A1 * | 11/2016 | ............ B60R 21/38 |
| DE | 102015007336 A1 * | 12/2016 | ............ B60R 21/38 |
| DE | 102016103198 A1 * | 8/2017 | ............ B60R 21/38 |
| FR | 2 883 606 A1 | 9/2006 | |
| JP | 2004-249795 A | 9/2004 | |
| JP | 2009-274498 A | 11/2009 | |

OTHER PUBLICATIONS

German-language Written Opinion (PCT/ISA/237) issued in PCT Application No. PCT/EP2016/052132 dated Apr. 13, 2016 (five pages).

German Search Report issued in counterpart German Application No. 10 2015 203 513.1 dated Jan. 25, 2016 with partial English translation (13 pages).

* cited by examiner

HINGE DEVICE WITH LIFTING DEVICE

CROSS REFERENCE TO RELATED APPLICATIONS

This application is a continuation of PCT International Application No. PCT/EP2016/052132, filed Feb. 2, 2016, which claims priority under 35 U.S.C. § 119 from German Patent Application No. 10 2015 203 513.1, filed Feb. 27, 2015, the entire disclosures of which are herein expressly incorporated by reference.

BACKGROUND AND SUMMARY OF THE INVENTION

The present invention concerns a hinge device for a front hood of a motor vehicle, which can be adjusted from a normal position to a protective position in the event of a collision. The present invention likewise concerns a motor vehicle provided with such a hinge device, as well as a method for adjusting such a hinge device.

With the hinge device of this kind, a pedestrian impact protection function should be realized, whereby in the event of a collision of the respective motor vehicle with a pedestrian or a bicycle rider the front hood is moved by a defined distance away from the vehicle body. In this way, at the same time, the distance of the front hood from a component located underneath, usually a rigid component such as a drive assembly, is increased, which may lessen the risk of injury to the pedestrian or bicycle rider struck by the vehicle.

The systems serving for impact protection have generally been known for a rather long time. In these systems, the front hood of a motor vehicle is actively lifted by means of an actuator upon sensor-controlled detecting of a possible front collision with a pedestrian.

Thus, from DE 101 52 621 A1 there is known an arrangement of a front hood on a motor vehicle with at least one rear hinge device—looking in the main direction of travel—and at least one front lock for retaining or lifting the front hood from a normal position to a protective position. A lifting of the front hood in its rear area occurs by activation of an actuator. A lifting of the front hood in its front area then occurs by a forced coupling device, especially a link guide, which forcefully carries along the front area of the front hood when lifted in its rear area. Furthermore, another actuator may optionally be provided at the front area of the front hood, supporting the force-guided movement of the front hood in the event of a collision.

A more accurate presentation of a hinge device known from the prior art is disclosed in DE 10 2009 040 413 A1. This document discloses a front hood of a motor vehicle, which can be adjusted from a normal position to a protective position in the event of a collision, with a body fastening part, which can be attached to the body of the motor vehicle, a front hood fastening part to which the front hood may be attached, a front hood hinged lever, to which the front hood fastening part is hinged, a first hinged lever and a second hinged lever, each of them hinged on the one hand to the body fastening part and on the other hand directly or indirectly to the front hood hinged lever, as well as an actuator equipped with a tappet, which can be brought into contact by an actuator surface against a front hood hinged lever contact surface.

It should be noted that the term "actuator" in this patent application is used as a generic term for a corresponding drive in its entirety, known from the prior art, especially DE 10 2011 106 513 A1 and FR 2883606 A1, but also synonymously in an individual case for its components, especially an actuator tappet or piston.

The hinge device known from DE 10 2009 040 413 A1 has a reliable design. However, it has a relatively large actuator, whose actuator surface in theory cannot always lie fully against the front hood hinged lever contact surface. This might present the risk of a skewing or twisting of the actuator or its tappet, which could lead to an inadequate raising movement and thus an undesirable positioning height of the front hood.

The problem which the present invention proposes to solve is to rule out the above-mentioned theoretical risk.

According to the invention, it is therefore provided that a front hood surface and a lifting device with an actuator contact surface and a front hood contact surface are provided on the front hood fastening part, wherein the actuator surface can be brought to bear against the actuator contact surface and the front hood contact surface can be brought to bear against the front hood surface during an adjustment from the normal position to the protective position. The distance which is provided substantially in the actuating direction of the actuator on the lifting device, between the front hood contact surface and the actuator contact surface, is greater than the distance between the actuator surface and the front hood hinged lever contact surface.

With the hinge device according to the invention it is advantageously made possible to employ a shorter actuator or actuator tappet than in the current prior art, since this directly raises the front hood fastening part—and thus the front hood—at a very early stage. In fact, the actuator drives the front hood fastening part via the lifting device provided according to the invention even before its actuator surface comes to bear against the front hood hinged lever contact surface. Thus, not only is the risk of a skewing or twisting of the actuator or the tappet minimized on account of the shorter length as compared to the prior art, but also the initially only direct application of force from actuator surface to actuator contact surface as well as front hood contact surface and front hood surface results in improved kinematics of the front hood fastening part and thus the front hood of the motor vehicle. Since a shorter actuator than in the prior art can be chosen for the hinge device according to the invention, the benefit of less installation space required for the hinge device is also obtained, since the lifting device which lengthens the path of the actuator is smaller in size than a conventional actuator.

Advantageously, it can be provided that the lifting device is mounted so as to be able to pivot about an axis arranged on the front hood hinged lever. In this way, already known standard components in automotive engineering can be used, especially axles which can be designed as pivot pins.

Advantageously, it can be provided to design the actuator contact surface of the lifting device and/or the front hood hinged lever contact surface complementary to the actuator surface in order to further improve the reliability of the respective pairings. In this case, a substantially normal or approximately perpendicular application of the force produced by the actuator or its tappet against the lifting device and the front hood hinged lever is specifically achieved during the entire raising process. Alternatively or additionally, it may likewise be provided advantageously to design the front hood contact surface complementary to the front hood surface; the aforementioned benefits will apply appropriately.

The front hood surface may advantageously be designed as a flange protruding from the front hood fastening part.

The arrangement of a flange on a hinge part, especially a front hood fastening part, is easily possible with conventional means of fabrication in mechanical engineering. Furthermore, it may be provided advantageously that the front hood surface designed as a flange has an opening, through which a fastener, especially a screw, can be led, by which the front hood can be fastened and secured on the flange-shaped front hood surface and thus on the front hood fastening part.

In order to prevent an unintentional raising of the front hood of the motor vehicle, according to the invention a securing pawl is provided on the lifting device, which is optionally coupled to a pin attached to the front hood hinged lever. The pin provided according to the invention is only released by the securing pawl when the actuator swivels and/or lifts the lifting device by a defined amount. However this securement not only prevents the aforementioned undesired raising movement during the driving of a motor vehicle according to the invention, but also makes possible a normal opening of the front hood in normal position, for example in order to undertake servicing work on subassemblies situated underneath the front hood.

An especially advantageously compact design of the hinge device according to the invention is achieved when the front hood hinged lever contact surface is designed as a flange, which protrudes from the front hood hinged lever and has a recess in which the lifting device can move. With this design, the lifting device can move virtually sideways past the front hood hinged lever and through the front hood hinged lever contact surface when the front hood is adjusted from a normal position to a protective position.

In another embodiment of the invention it may be provided that the distance existing substantially in the actuating direction of the actuator between the actuator surface and the front hood hinged lever contact surface and the distance existing between the actuator surface and the actuator contact surface is equal to zero. Thus, in this case, the actuator surface drives both the front hood hinged lever contact surface—and thus the front hood hinged lever—at the same time as the front hood fastening part. Due to the fact that now the front hood hinged lever is also driven, the actuator contact surface detaches from the actuator surface and thus the lifting device itself detaches from the actuator surface, so that the further raising movement of the hinge device according to the invention can occur in a safe and dependable manner.

The above-mentioned problem is likewise solved with a motor vehicle having a hinge device of the above-mentioned kind. The benefits mentioned above in regard to the hinge device itself likewise apply to a motor vehicle equipped with it.

Finally, the above-mentioned problem is solved by a method according to the invention, which calls for the following steps:
1. Starting an extension of the actuator provided with an actuator surface from the normal position;
2. Bringing the actuator surface into contact with the actuator contact surface located on the lifting device under continuing extension of the actuator;
3. Bringing the front hood contact surface located on the lifting device into contact with the front hood surface under continuing extension of the actuator;
4. Bringing the actuator surface into contact with the front hood hinged lever contact surface under continuing extension of the actuator;
5. Bringing the actuator contact surface out of contact with the actuator surface under continuing extension of the actuator;
6. Ending of the extension of the actuator once a desired position of the actuator surface has been reached.

With these method steps according to the invention it is advantageously possible to lift the front hood by a driving of the front hood fastening part already before the actuator even touches the front hood hinged lever at all. The benefits described in connection with the hinge device according to the invention thus also apply to the method according to the invention.

This holds, in particular, when the securing pawl under continuing extension of the actuator is released from the pin attached to the front hood hinged lever after bringing the front hood contact surface into contact with the front hood surface.

Other objects, advantages and novel features of the present invention will become apparent from the following detailed description of one or more preferred embodiments when considered in conjunction with the accompanying drawings.

DETAILED DESCRIPTION OF THE DRAWINGS

A detailed, nonprejudicial, especially nonlimiting description of a sample embodiment of the present invention shall be given below with reference to FIGS. 1 to 4.

Figure 1:
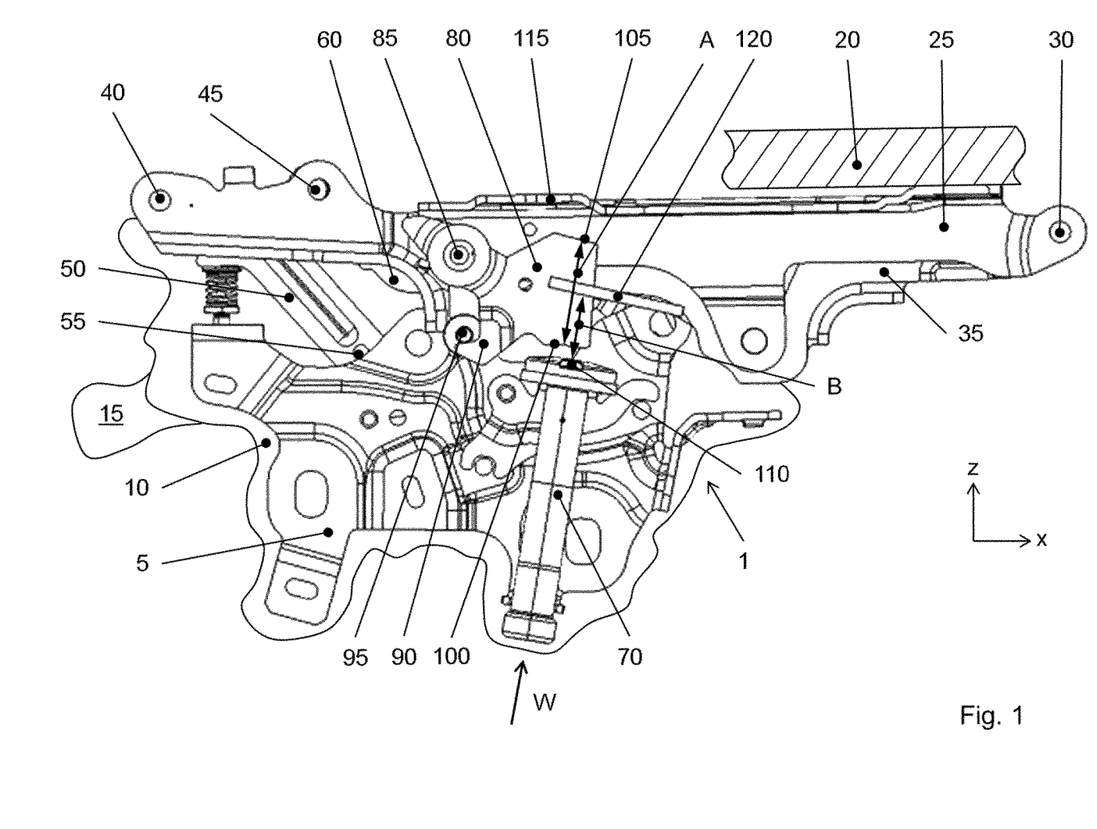
FIG. 1 is a side view of a hinge device according to an embodiment of the invention in normal position.

FIG. 1 shows a hinge device 1 according to an embodiment of the invention in side view. For better orientation, a vehicle-bound Cartesian coordinate system is depicted, such as is customarily used in automotive engineering. Hence, the hinge device 1 is located in the x-z plane of this coordinate system.

The hinge device 1 is attached by a body fastening part 5 to the body 10 of the motor vehicle according to the invention. The motor vehicle 15, as usual, has a front hood 20, which is fastened to a front hood fastening part 25. The front hood fastening part 25 has a pivot axis 30 at its right section in FIG. 1, corresponding to the front section looking in the main direction of travel of a motor vehicle 15, about which the front hood fastening part 25 swivels from a normal position to a protective position when raising the front hood 20. The pivot axis 30 itself can be designed in particular as a bolt.

A front hood hinged lever 35 is likewise hinged to the pivot axis 30, extending to the left in FIG. 1, i.e., against the main direction of travel of the motor vehicle 15. At its distal region with respect to the pivot axis 30, the front hood hinged lever 35 has two additional pivot axes 40 and 45, which may likewise be designed as pins. The first pivot axis 40 articulates with a first hinged lever 50, whose distal end is mounted on the body fastening part 5 and is able to rotate about a pivot axis 55. A second hinged lever 60 that is able to swivel about the pivot axis 45 is likewise mounted on the body fastening part 5 and able to rotate about a pivot axis 65

Figure 4:
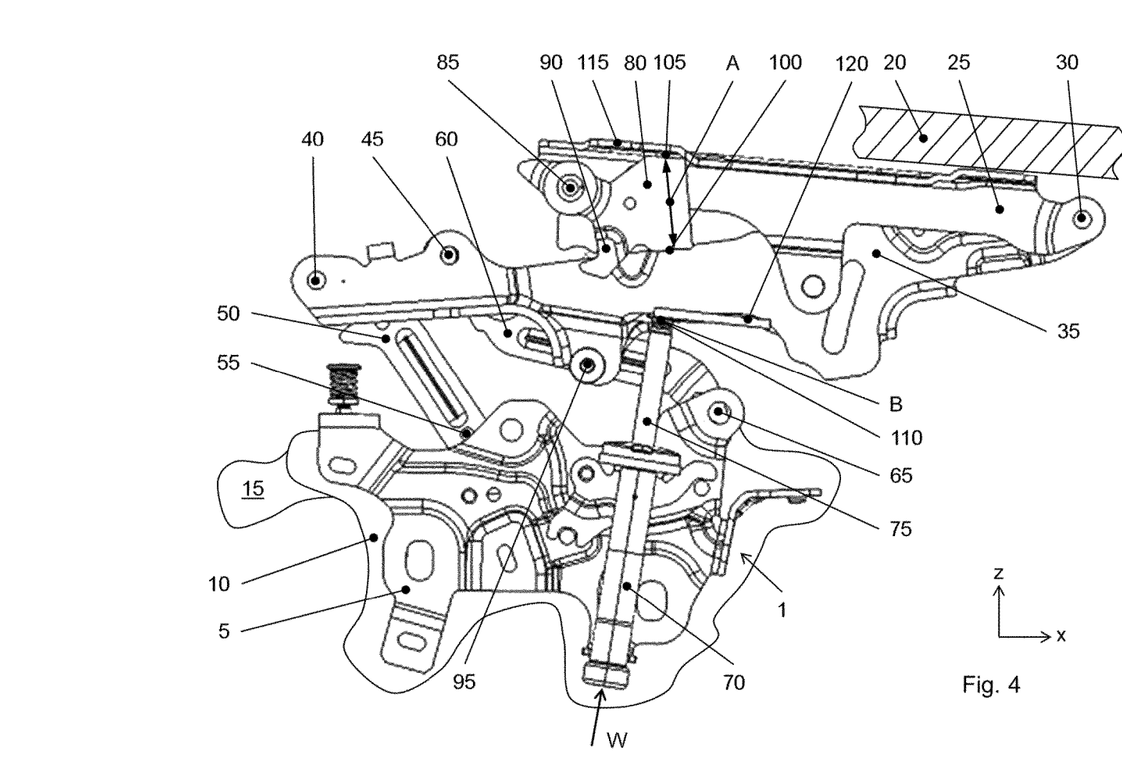
FIG. 4 shows the hinge device represented in FIGS. 1 to 3 in protective position.

(see FIG. 4). By means of the first hinged lever 50 and the second hinged lever 60 it is possible, on the one hand, to open the front hood 20 in a familiar manner in a normal condition of the motor vehicle 15. For example, if the front hood 20 is a typical engine hood, this can be swiveled by swiveling the first hinged lever 50 and the second hinged lever 60 in particular to carry out servicing work on the drive assembly (not shown). Furthermore, it is possible to raise the first pivot lever 50 and the second pivot lever 60 from a normal position into a protective position in the event of a collision of the motor vehicle 15 with a pedestrian or a bicycle rider, as shall be described below. Advantageously, the first hinged lever 50 is shorter than the second hinged lever 60.

Moreover, an actuator 70 is fastened to the body fastening part 5 such that its operative direction W is tilted at a slant in the x-z plane, by around 80° with respect to the vehicle's longitudinal direction in the example shown here. In the event of a collision, a tappet 75 (shown respectively in FIGS. 2 to 4) is displaced in the operative direction W within milliseconds. The displacement itself may be triggered in particular by a pyrotechnical charge.

According to the invention, the hinge device 1 comprises a lifting device 80, which can swivel about a pivot axis 85 located on the front hood fastening part 25 if the front hood 20 needs to be raised in the event of a collision. To avoid an unintentional raising of the front hood 20 from a normal position, the lifting device 80 is fastened removably by way of a securing pawl 90 to a pin 95 attached to the front hood hinged lever 35. It should be noted that, besides the aforementioned form-fitting securement solution, other kinds of securement, especially integrally bonded or friction-locking connections, may also be considered in order to avoid an unintentional swiveling of the lifting device 80 about the pivot axis 85.

As may also be seen from FIG. 1, the lifting device 80 comprises an actuator contact surface 100 in its lower region shown in FIG. 1 and a front hood contact surface 105 in its upper region in the figure. While the actuator contact surface 100 and front hood contact surface 105 are free in the normal position, when adjusted from the normal position to the protective position they lie against a complementary-shaped actuator surface 110 or front hood surface 115 respectively (see FIG. 2).

On the underside of the front hood hinged lever 35 is situated a front hood hinged lever contact surface 120. This lever contact surface 120 is designed such that the lifting device 80, during an adjustment of the hinge device 1 from a normal position to a protective position, can dip through it. For this, a recess (not further shown in this figure) can be provided in the x-y plane of the front hood hinged lever contact surface 120.

According to the invention, the distance A provided on the lifting device 80 between front hood contact surface 105 and actuator contact surface 100 is greater than the distance B between actuator surface 110 and front hood hinged lever contact surface 120. The distance relations shown in FIG. 1 are represented in simplified form, and disregarding the rotational movement of the lifting device 80 about the pivot axis 85 which occurs during the adjustment process of the front hood 20 from a normal position to a protective position, since the relevant swivel arm to be considered here is relatively small. However, it should be pointed out that the mentioned distance relations of the distances A and B also apply to a swivel arm of larger, no longer negligible radius, and are within the scope of the hinge device 1 according to the invention.

Figure 2:
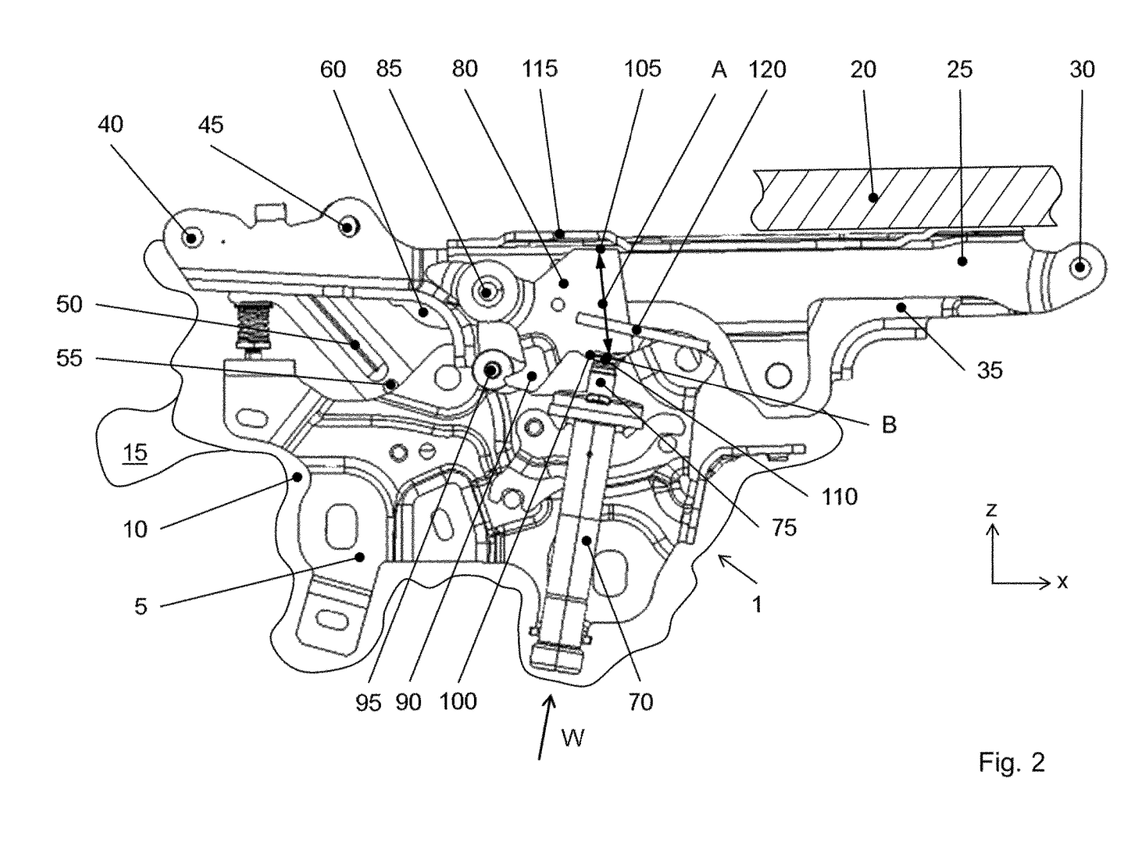
FIG. 2 is a side view of the hinge device shown in FIG. 1 in which a securing pawl releases a pin attached to the front hood hinged lever.

As is shown in FIG. 2, the tappet 75 of the actuator 70 moves in the operative direction W such that the actuator surface 110 comes to bear against the actuator contact surface 100 of the lifting device 80. Upon continued movement of the tappet 75, the lifting device 80 swivels about the pivot axis 85 such that the front hood contact surface 105 of the lifting device 80 comes into contact with the front hood surface 115. In the course of this movement, the securing pawl 90 releases the pin 95. The front hood surface 115 in the example shown here is formed as a flange, protruding from the front hood fastening part 25 in the x-y plane. In this way, it is advantageously possible for the front hood contact surface 105 to lie exactly against the front hood surface 115, which is beneficial to the precision of both the time sequences within the raising process and the travel path of the front hood 20 being raised. This is especially so when the actuator contact surface 105 is likewise formed complementary to the actuator surface 110.

Figure 3:
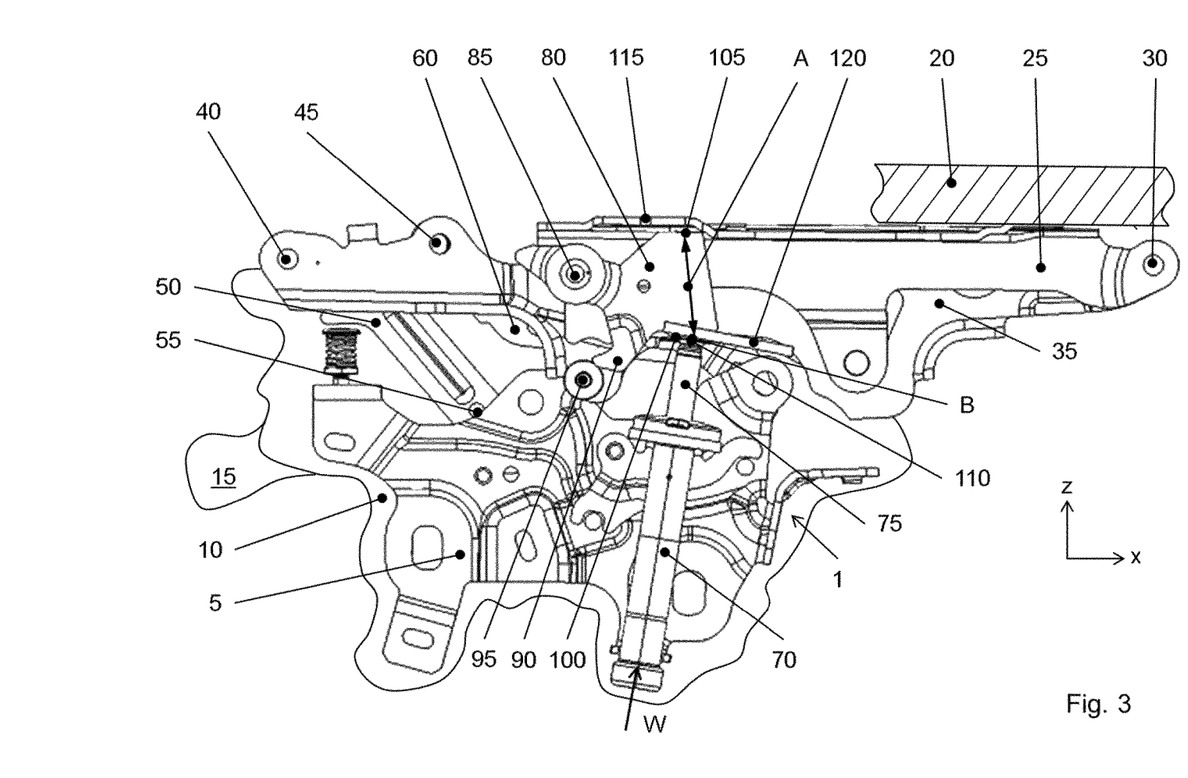
FIG. 3 shows the hinge device represented in FIGS. 1 and 2 in which the actuator surface rests both against the front hood hinged lever contact surface and against the actuator contact surface.

In FIG. 3, the tappet 75 of the actuator 70 has extended even further along the displacement path W than in FIGS. 1 and 2, and is represented at a time when the actuator surface 110 lies both against the actuator contact surface 100 and against the front hood hinged lever contact surface 120. This is the time when the active driving of the hinge device 1 according to the invention moves from the front hood fastening part 25 to the front hood hinged lever 35. Thus, while previously a combined raising and adjusting movement of the hinge device 1 occurred solely by driving of the front hood fastening part 25, this movement now occurs solely by driving the front hood hinged lever 35, since upon continuation of the movement of the tappet 75 shown in FIG. 3 the lifting device 80 dips down entirely through the front hood hinged lever contact surface 120 and is released from it. Hence, the distance existing between the actuator surface 110 and the front hood hinged lever contact surface 120 and the distance existing between the actuator surface 110 and the actuator contact surface 100 are equal to zero.

FIG. 4 now shows the hinge device 1 entirely in the protective position. The actuator surface 110 continues to be in contact with the flange-shaped front hood hinged lever contact surface 120, while the lifting device 80 is substantially distant from the actuator surface 110.

The steps previously performed with reference to FIGS. 1 to 4 for the adjusting of a front hood 20 with the aid of the hinge device 1 according to the invention may be summarized as follows:

1. Starting an extension of the actuator 70 provided with an actuator surface 110 from the normal position;
2. Bringing the actuator surface 110 into contact with the actuator contact surface 100 located on the lifting device 80 under continuing extension of the actuator;
3. Bringing the front hood contact surface 105 located on the lifting device 80 into contact with the front hood surface 115 under continuing extension of the actuator 70;
4. Bringing the actuator surface 110 into contact with the front hood hinged lever contact surface 120 under continuing extension of the actuator 70;
5. Bringing the actuator contact surface 100 out of contact with the actuator surface 110 under continuing extension of the actuator 70;
6. Ending of the extension of the actuator 70 once a desired position of the actuator surface 110 has been reached.

As described above, a securement exists against an unintentional releasing of the hinge device 1. It may therefore be provided between the 2nd and 3rd step to release the securing pawl 90 under continuing extension of the actuator 70 from the pin 95 attached to the front hood hinged lever 35 after bringing the front hood contact surface 105 into contact with the front hood surface 115 and to hold it in the released condition.

LIST OF REFERENCE SYMBOLS 1 hinge device
5 body fastening part
10 body
15 motor vehicle
20 front hood
25 front hood fastening part
30 pivot axis
35 front hood hinged lever
40 pivot axis
45 pivot axis
50 first hinged lever
55 pivot axis
60 second hinged lever
65 pivot axis
70 actuator
75 tappet
80 lifting device
85 pivot axis
90 securing pawl
95 pin
100 actuator contact surface
105 front hood contact surface
110 actuator surface
115 front hood surface
120 front hood hinged lever contact surface
A distance between the front hood contact surface and the actuator contact surface
B distance between the actuator surface and the front hood hinged lever contact surface
W operative direction of the actuator
x,y,z vehicle-oriented Cartesian coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hinge device for a front hood of a motor vehicle which is adjustable from a normal position to a protective position in an event of a collision, comprising:
a body fastening part, which is attachable to a body of the motor vehicle;
a front hood fastening part to which the front hood is attachable,
a front hood hinged lever to which the front hood fastening part is hinged,
a first hinged lever and a second hinged lever, each being hinged on the one hand to the body fastening part and on the other hand directly or indirectly to the front hood hinged lever;
an actuator equipped with a tappet, which is brought into contact by an actuator surface against a front hood hinged lever contact surface;
a front hood surface; and
a lifting device with an actuator contact surface and a front hood contact surface, the front hood surface and the lifting device being provided on the front hood fastening part, wherein
the actuator surface is brought to bear against the actuator contact surface and the front hood contact surface is brought to bear against the front hood surface during an adjustment from the normal position to the protective position, and
a distance (A) which is provided substantially in an actuating direction of the actuator on the lifting device, between the front hood contact surface and the actuator contact surface, is greater than a distance (B) between the actuator surface and the front hood hinged lever contact surface.

2. The hinge device as claimed in claim 1, wherein the lifting device is mounted so as to be able to pivot about a pivot axis arranged on the front hood hinged lever.

3. The hinge device as claimed in claim 1, wherein the actuator contact surface of the lifting device and/or the front hood hinged lever contact surface are designed complementary to the actuator surface.

4. The hinge device as claimed in claim 1, wherein the front hood surface is designed as a flange protruding from the front hood fastening part.

5. The hinge device as claimed in claim 1, wherein the lifting device has a securing pawl, which is optionally coupled to a pin attached to the front hood hinged lever.

6. The hinge device as claimed in claim 1, wherein the front hood hinged lever contact surface is designed as a flange, which protrudes from the front hood hinged lever and has a recess in which the lifting device can move.

7. The hinge device as claimed in claim 1, wherein the distance existing substantially in the actuating direction of the actuator between the actuator surface and the front hood hinged lever contact surface and the distance existing between the actuator surface and the actuator contact surface is equal to zero.

8. A motor vehicle, comprising:
a hinge device for a front hood of the motor vehicle which is adjustable from a normal position to a protective position in an event of a collision, the hinge device comprising:
a body fastening part, which is attachable to a body of the motor vehicle;
a front hood fastening part to which the front hood is attachable,
a front hood hinged lever, to which the front hood fastening part is hinged,
a first hinged lever and a second hinged lever, each being hinged on the one hand to the body fastening part and on the other hand directly or indirectly to the front hood hinged lever;
an actuator equipped with a tappet, which is brought into contact by an actuator surface against a front hood hinged lever contact surface;
a front hood surface; and
a lifting device with an actuator contact surface and a front hood contact surface, the front hood surface and the lifting device being provided on the front hood fastening part, wherein
the actuator surface is brought to bear against the actuator contact surface and the front hood contact surface is brought to bear against the front hood surface during an adjustment from the normal position to the protective position, and
a distance (A) which is provided substantially in an actuating direction of the actuator on the lifting device, between the front hood contact surface and the actuator contact surface, is greater than a distance (B) between the actuator surface and the front hood hinged lever contact surface.

9. The motor vehicle as claimed in claim 8, wherein the lifting device is mounted able to pivot about a pivot axis arranged on the front hood hinged lever.

10. The motor vehicle as claimed in claim 8, wherein the actuator contact surface of the lifting device and/or the front hood hinged lever contact surface are designed complementary to the actuator surface.

11. The motor vehicle as claimed in claim 8, wherein the front hood surface is designed as a flange protruding from the front hood fastening part.

12. The motor vehicle as claimed in claim 8, wherein the lifting device has a securing pawl, which is optionally coupled to a pin attached to the front hood hinged lever.

13. The motor vehicle as claimed in claim 8, wherein the front hood hinged lever contact surface is designed as a flange, which protrudes from the front hood hinged lever and has a recess in which the lifting device can move.

14. The motor vehicle as claimed in claim 8, wherein the distance existing substantially in the actuating direction of the actuator between the actuator surface and the front hood hinged lever contact surface and the distance existing between the actuator surface and the actuator contact surface is equal to zero.

15. A method for adjusting a front hood of a motor vehicle from a normal position to a protective position with a hinge device as claimed in claim 1, the method comprising the acts of:
1) starting an extension of the actuator provided with the actuator surface from the normal position;
2) bringing the actuator surface into contact with the actuator contact surface located on the lifting device under continuing extension of the actuator;
3) bringing the front hood contact surface located on the lifting device into contact with the front hood surface under continuing extension of the actuator;
4) bringing the actuator surface into contact with the front hood hinged lever contact surface under continuing extension of the actuator;
5) bringing the actuator contact surface out of contact with the actuator surface under continuing extension of the actuator; and
6) ending the extension of the actuator once a desired position of the actuator surface has been reached.

16. The method as claimed in claim 15, further comprising the act of:
releasing a securing pawl under continuing extension of the actuator from a pin attached to the front hood hinged lever after bringing the front hood contact surface into contact with the front hood surface.

* * * * *